United States Patent [19]
Woltron

[11] Patent Number: 4,762,307
[45] Date of Patent: Aug. 9, 1988

[54] LEAF SPRING OF PLASTIC MATERIAL AND METHOD FOR ITS MANUFACTURE

[75] Inventor: Herbert Woltron, Modling, Austria

[73] Assignee: Isoport Verbundbauteile G.m.b.H., Austria

[21] Appl. No.: 885,569

[22] PCT Filed: Oct. 23, 1985

[86] PCT No.: PCT/AT85/00042
§ 371 Date: Jun. 23, 1986
§ 102(e) Date: Jun. 23, 1986

[87] PCT Pub. No.: WO86/02601
PCT Pub. Date: May 9, 1986

[30] Foreign Application Priority Data
Oct. 25, 1984 [AT] Austria .................. 3418/84

[51] Int. Cl.[4] .............. F16F 1/18; F16F 1/26; F16F 1/36
[52] U.S. Cl. .................. 267/47; 267/158; 267/260; 267/270
[58] Field of Search .......... 267/54 R; 267/40, 41, 267/42, 47, 158, 260, 270

[56] References Cited
U.S. PATENT DOCUMENTS

| | | | |
|---|---|---|---|
| 4,411,159 | 10/1983 | Spear et al. | 267/47 X |
| 4,505,460 | 3/1985 | LeGallais | 267/54 R |
| 4,562,998 | 1/1986 | Ward | 267/54 R |

FOREIGN PATENT DOCUMENTS

| | | | |
|---|---|---|---|
| 106249 | 4/1984 | European Pat. Off. | |
| 215365 | 3/1987 | European Pat. Off. | 267/53 |
| 52637 | 5/1981 | Japan | 267/47 |
| 58-61343 | 7/1983 | Japan | |
| 89841 | 5/1984 | Japan | 267/47 |

Primary Examiner—Randolph A. Reese
Assistant Examiner—John A. Ricci
Attorney, Agent, or Firm—Bierman and Muserlian

[57] ABSTRACT

A leaf spring of plastic material having a spring body of fiber-reinforced plastic material, which at least at one end is provided with a thickening, with an end zone (1) of the spring body increasing in its thickness towards the spring end (5'). On this thickened end zone (1), a spring eye body (6, 19, 26) is wedged up at its appropriately laminar mounting zones with the aid of clamping sleeves.

For the manufacture of the plastic material leaf spring, one advantageously starts with a spring body, the end zone (1) of which exhibits plane parallel top and bottom sides (2, 3), respectively, on which coatings of a plastic mass of fiber-reinforced duromer plastic material are applied to form the aforementioned thickening. Subsequently, the spring eye body (6, 19, 26) is mounted, and its mounting zones are wedged by means of the clamping sleeve(s) onto the spring body's end zone (1) provided with the coatings, whereby plastic material from these coatings appropriately penetrates the surface structure provided at the pressure surfaces of the mounting zones, whereupon the plastic coatings are cured at a higher temperature.

14 Claims, 2 Drawing Sheets

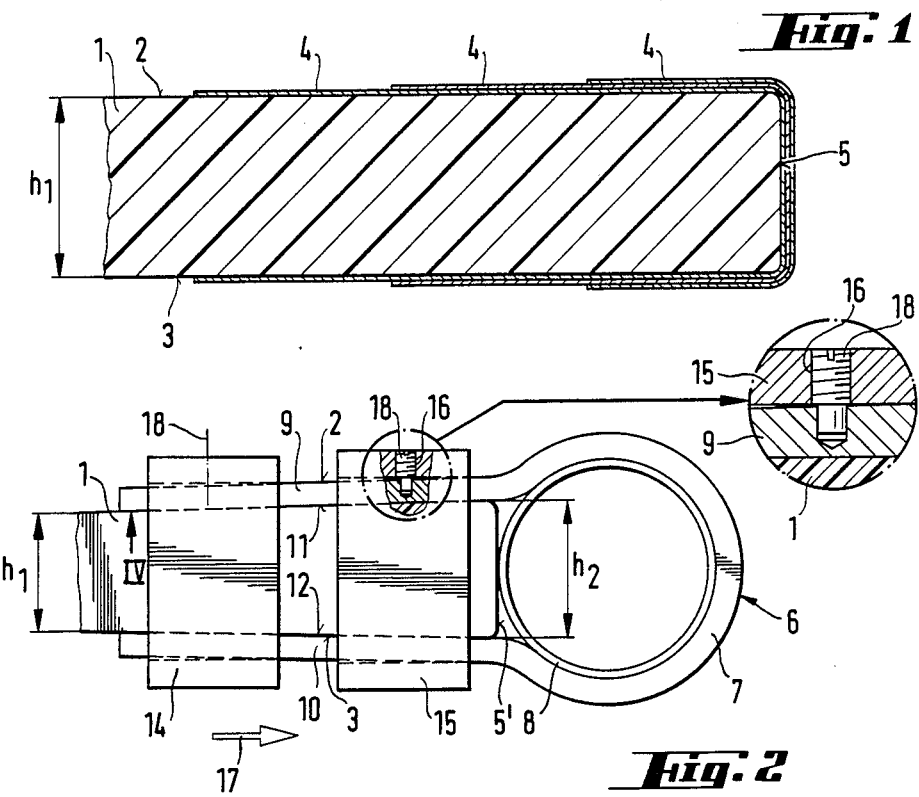
Fig. 1
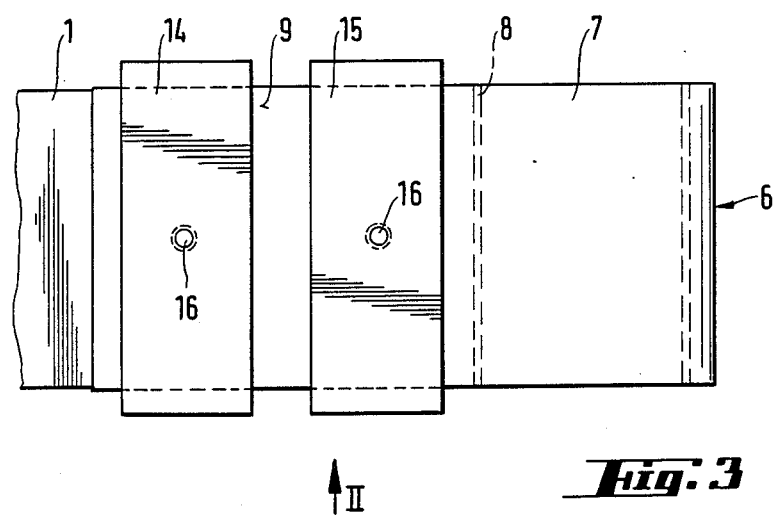
Fig. 2
Fig. 3

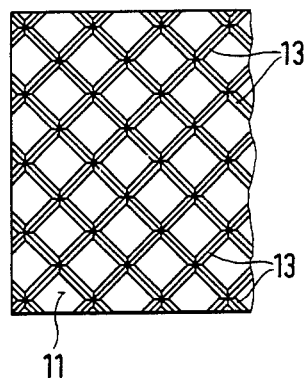
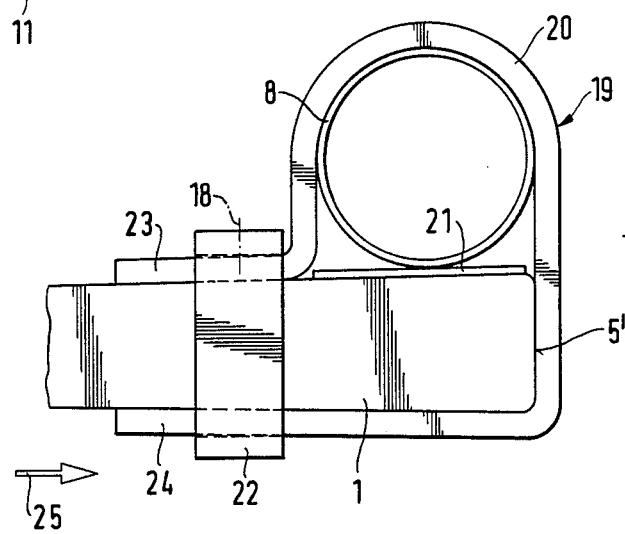
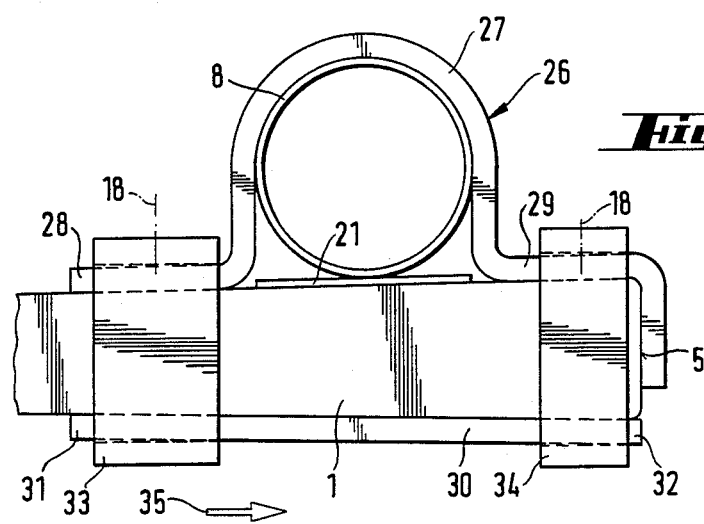

LEAF SPRING OF PLASTIC MATERIAL AND METHOD FOR ITS MANUFACTURE

TECHNICAL DOMAIN

The invention is concerned with a leaf spring of plastic material, which at least at one end is joined to a spring eye body. Furthermore, it is concerned with an advantageous method for the manufacture of such a leaf spring of plastic material.

STATE OF THE ART

A plastic material leaf spring of the aforesaid type is known from the European Patent Application No. 83109842.1 (Publication No. 106249). In this known leaf spring, the spring end is fastened in a slot of the spring eye body by means of screws which extend through borings in the spring end. However, these borings bring about an unwelcome mechanical weakening of the spring end.

DESCRIPTION OF THE INVENTION

The objective of the invention is, to begin with, to present a leaf spring of plastic material in which the spring eye bodies are fastened at the spring ends in such a manner that a mechanical weakening of the spring ends is avoided.

This problem is solved in the plastic material leaf spring according to the invention, which is characterized by that the body of the spring is provided at least at one of the spring ends with a thickening at which one end zone of the spring body increases in thickness towards the spring end, by that the mounting zones, of laminar design in appropriate circumstances, adjoin the top and bottom sides of this end zone of the spring body, and by that at least one clamping sleeve is provided slipped over the spring body's end zone and over the mounting zones adjoining it, which clamping sleeve wedges these mounting zones onto the spring body's end zone, and which can advantageously be secured against displacement relative to the mounting zones, appropriately by means of screws or pins. The spring eye body may advantageously support itself against the blunt spring end.

In an advantageous embodiment of the invention, the leaf spring according to the invention is characterized by that the spring eye body has at least two parts separated from each other, which with their mounting zones adjoin the top and bottom side of the spring body's end zone, respectively.

According to another advantageous embodiment of the invention, the plastic material leaf spring has mounting zones which, at their pressure surfaces adjoining the end zone of the spring body, exhibit a relief-like surface structure, appropriately formed by grooves, into the recesses of which the plastic material of the spring body has penetrated.

According to additional advantageous embodiments of the plastic leaf spring according to the invention, it exhibits two clamping sleeves which are slipped and wedged onto the same pair of mounting zones or onto different pairs of mounting zones.

In another advantageous embodiment of the invention, the plastic leaf spring according to the invention is characterized by that the spring eye body exhibits a bent strip of steel or of fiber-reinforced plastic material, which in partial zones, appropriately its end zones, comprises the mounting zones to be wedged onto the end zone of the spring body. Advantageously, this piece of strip is joined to a spring eye bushing, which latter is braced directly or through an intermediate layer on the top or bottom side of the spring body's end zone, in which case the spring eye bushing can advantageously be arranged between the two clamping sleeves, or otherwise it advantageously braces itself against the blunt spring end.

According to a further advantageous embodiment of the plastic leaf spring according to the invention, it is characterized by that the bent piece of strip fits closely against a part of the surface of the spring bushing.

In another advantageous embodiment of the invention, the plastic leaf spring according to the invention is characterized by that the bent piece of strip is connected to the spring eye bushing form-lockingly and/or frictionally.

According to a last advantageous embodiment of the invention, the plastic leaf spring according to the invention exhibits a spring eye body with two pieces of strip of steel or of fiberreinforced plastic material, which with their parts that form the mounting zones adjoin one and ther side of the end zone of the spring eye, respectively.

The invention has the further objective of setting forth an advantageous method for the manufacture of the leaf spring of plastic material according to the invention.

In the method according to the invention, this problem is solved in a manner characterized by that a leaf spring body is manufactured from a fiber-reinforced plastic material, which at least at one spring end exhibits an end zone with essentially plane parallel top and bottom sides; by that to these top and bottom sides, or at least to one of them, a coating of plastic material is applied, which is composed of a plastic mass of duromer plastic containing reinforcing fibers, and the thickness of which increases towards the spring end; by that subsequently the spring eye body, which has mounting zones of appropriately laminar design, is placed on the end zone of the spring body provided with these plastic coatings, so that the mounting zones adjoin these coatings; and by that at least one clamping sleeve is slipped over the spring body's end zone and over the mounting zones adjoining it and thereby wedging the latter onto the spring body's end zone, whereupon the plastic coatings are cured. Advantageously, a spring eye body with mounting zones is used, which latter exhibit at their pressure surfaces adjoining the plastic material coatings of the spring body's end zone a relief-like surface structure, appropriately formed by grooves, so that when the mounting zones are wedged onto the spring body's end zone, plastic material from the coatings penetrates into the recesses of this surface structure.

BRIEF DESCRIPTION OF THE DRAWINGS IN CONNECTION WITH THREE WAYS OF CARRYING OUT THE INVENTION

For the manufacture of the plastic material leaf spring, one starts with, e.g., a spring body of glass-fiber reinforced epoxy resin, e.g., such as described in the European Patent Application No. 83109842.1 (Publication No. 106 249).

FIG. 1 shows, on an enlarged scale, a section of the end zone 1 of such a spring body, which first of all exhibits plane parallel top and bottom sides 2 and 3, respectively, provided with a rough grinding. These leaf springs have, e.g., a width of 60 mm and at this end zone 1 a thickness of $h_1=20$ mm. To produce a thickening at the spring body's end zone 1, e.g., three glassfiber roving fabrics 4, impregnated with liquid epoxy resin with a resin coating of 40% (solid matter) and with a warp to weft ratio of 1:1 and a weight per unit area of 500 g/m$^2$, are piled up in leaf spring width and in varying lengths, and this stack, as shown in FIG. 1, is placed in U-shape around the spring end 5, in such a manner that the two U-legs adjoin the top and bottom side 2 and 3, respectively, of the spring body's end zone 1, so that they form there a thin coating, the thickness of which gradually increases in the direction towards the spring end 5.

In FIGS. 2 and 3, the end zone 1 of the leaf spring is shown schematically in vertical and horizontal projection, respectively, after being provided with a spring eye body 6 serving to introduce force into the spring end. This spring eye body 6 is comprised of a U-shaped steel strip piece 7 which, in its widened U-bend, fits closely against the surface of a spring eye bushing 8 made of steel that in turn is braced against the blunt spring end 5'. The two legs of the U-shaped steel strip piece 7 form the mounting zones 9, 10 and, at their pressure surfaces 11, 12 adjoining the top and bottom side 2 and 3, respectively, of the spring body's end zone 1, exhibit a relief-like surface structure formed by inwrought grooves 13. FIG. 4 shows the arrangement of the grooves 13 in a partial representation as plan view in the direction of arrow IV in FIG. 2.

To mount the spring eye body 6 on the spring body's end zone 3, two clamping sleeves 14, 15, each of which consists of a piece of a square tube of heat-treated steel exhibiting a tapped hole 16, are loosely slipped onto the spring body against the direction of arrow 17 and thereupon—as already described with the aid of FIG. 1—the roving fabrics 4 impregnated with epoxy resin are applied to the spring body's end zone 1. Subsequently, the U-shaped steel strip 7, together with spring eye bushing 8, is placed on the spring body's end zone 1, the two clamping sleeves 15 and 14 are successively slipped in the direction of arrow 17 onto the two mounting zones 9, 10 of the steel strip piece 7 and wedged on there. Thereafter, the mounting zone 9 is drilled through the tapholes 16 into the clamping sleeves 14, 15 and worm screws 18 are then affixed in the tapholes 16, which screws reach into the borings in the mounting zone 9 and thusly secure the clamping sleeves 14, 15 against displacement.

Through the wedging of the clamping sleeve 14, 15 onto the mounting zones 9, 10 of the steel strip piece 7, the grooved pressure surfaces 11, 12 of the mounting zones 9, 10 are pressed with great force onto the glass fiber roving fabrics impregnated with epoxy resin, whereby these roving fabrics become so deformed that they form wedge-shaped coatings on the top and bottom sides 2 and 3, respectively, of the spring body's end zone 1, whereby epoxy resin penetrates into the grooves 13 of the pressure surfaces 11, 12 of the mounting zones 9, 10. Together with these wedgeshaped coatings, the spring body's end zone 1 increases in the present example from a thickness $h_1=20$ mm to a thickness $h_2=23$ mm towards the spring end 5'. To accelerate the curing of these coatings, the spring body now provided with spring eye bodies 6 is heated, e.g., in an air heater, for a short time to a temperature of 80° C., at which the curing reaction of the epoxy resin is started, whereupon it quickly hardens and the above-mentioned wedge-shaped coatings are combined with the epoxy resin material of the spring body, so that no seam is visible. A form-locking and frictional joint now obtains between the spring body's end zone 1 and the affixed spring eye core 6, and the plastic material leaf spring is essentially ready for use.

FIG. 5 schematically shows in vertical projection the spring body's end zone 1 with the applied spring eye body 19 of another advantageous realization of the plastic material leaf spring according to the invention. In this realization, the spring eye body 19 is comprised of a bent and hardened steel strip piece 20 as well as of a spring eye bushing 8, an intermediate layer 21 and a clamping sleeve 22, all of which are also of steel. The straight ends of the bent steel strip piece 20 serving as mounting zones 23, 24 are provided with a grooved, relief-like surface structure at their pressure surfaces adjoining the spring body's end zone 1, in a manner similar to the realization according to FIGS. 2 and 3 (see FIG. 4).

To attach the spring eye body 19, the clamping sleeve 22 is first loosely slipped onto the spring body counter to the direction of arrow 25 and thereupon—as explained with the aid of FIG. 1—glass fiber roving fabrics impregnated with epozy resin are applied to the spring body's end zone 1. Subsequently, the steel strip piece 20 together with the intermediate layer 21 and the spring eye bushing 8 are placed on the spring body's end zone 1, and thereafter the clamping sleeve 22 is slipped on, in direction of arrow 25, onto the two mounting zones 23, 24 of the steel strip piece 20, where it is wedged up.

The clamping sleeve 22 is then secured against displacement by means of a worm screw 18, and the epoxy resin contained in the glass fiber roving fabrics is cured, in a manner analogous to that of the spring variant described with the aid of FIGS. 2 and 3.

A further advantageous realization of the plastic material leaf spring according to the invention is described with the aid of FIG. 6. This Figure shows schematically in vertical projection the spring body's end zone 1 with the spring eye body 26. In this realization, the spring eye body 26 has a bent steel strip piece 27 which—in a manner analogous to the plastic leaf spring according to FIG. 5—presses a spring eye bushing 8 over an intermediate layer 21 onto the spring body's end zone 1, which latter increases in thickness in a wedgelike manner towards the spring end 5'. The steel strip piece 27 with two mounting zones 28 and 29 situated at both sides of spring eye bushing 8 thereby adjoins one side of the spring body's end zone 1 and in addition also braces itself against the blunt spring end 5'. Besides this bent steel strip piece 27, the spring eye body 26 also comprises a second, straight steel strip piece 30 which adjoins the other side of the spring body's end zone 1 and the ends of which form additional mounting zones 31, 32 of the spring eye body 26. The pressure surfaces of the mounting zones 28, 29, 31 and 32 are provided with a relief-like surface structure—also as described with the aid of FIG. 4. Two clamping sleeves 33 and 34 serve to affix the two steel strip pieces 27 and 30, with clamping sleeve 33 being pressed onto the mounting zone pair 28, 31 and the clamping sleeve 34 being pressed onto the holding zone pair 29, 32, each in the direction of arrow 35, with the clamping sleeves thereby being wedged up. Worm screws 18 secure the clamping sleeves 33, 34 against displacement. Creation of the wedge-shaped thickening of the spring body's end zone and the applying of the spring eye body 26 is done in a manner analogous to that described with the aid of FIGS. 1 through 3.

In the above described embodiments of the plastic material leaf spring, the components of the spring eye bodies 6, 19 and 26 are all made of steel. For the purpose of weight reduction, the steel strip pieces 7, 20, 27 and 30 can in these spring eye bodies be advantageously replaced by appropriately shaped parts of fiber-reinforced duromer plastic material, especially epoxy resin, in which high-strength reinforcement fibers, such as glass fibers, carbon fibers or similar, run in the longitudinal direction of the strip.

For the manufacture of these band-shaped parts, several pieces of glass fabric, for example, impregnated with a liquid epoxy resin are superposed and cured in a forming die. For this one uses, for example, a glass fiber roving fabric with a warp to weft ratio of 1:1 and with a weight per unit area of 500 g/m$^2$, provided with a resin coating of 35% (solid matter).

COMMERCIAL APPLICATION

The plastic material leaf springs according to the invention can be used in motor vehicles in a manner similar to the customary steel leaf springs. Their advantages over the steel leaf springs are particularly their substantially lower weight and that they are not subject to any corrosion while in use.

I claim:

1. Leaf spring having a body of plastic material, joined at least at one end to a spring eye body having mounting zones, wherein said spring body is provided with at least one spring end zone with a wedge-like thickening, which increases in thickness towards the spring end (5'), wherein said mounting zones of the spring eye body (6,19,26), appropriately of laminar design, adjoin the top and bottom sides (2,3) of said end zone (1) of the spring eye body, and wherein at least one clamping sleeve is provided that is slipped over the spring body's end zone (1) and over the mounting zone adjoining it, which clamping sleeve wedges these mounting zones onto the spring body's end zone (1).

2. Leaf spring of plastic material according to claim 1, wherein wedged up clamping sleeves are secured against displacement relative to the mounting zones, appropriately by means of screws (18) and/or pins.

3. Leaf spring of plastic material according to claim 1, wherein the spring eye body (6, 19, 26) is braced against the blunt spring end (5').

4. Leaf spring of plastic material according to claim 1, wherein the spring eye body (26) has at least two parts (27, 30), separated from each other, which with their mounting zones adjoin the top and bottom side, respectively, of the spring body's end zone (1).

5. Leaf spring of plastic material according to claim 1, wherein the mounting zones, at their pressure surfaces (11, 12) adjoining the spring body's end zone (1), exhibit a relief-like surface structure, appropriately formed by grooves (13), into the recesses of which plastic material of the spring body (1) has penetrated.

6. Leaf spring of plastic material according to claim 1, wherein two clamping sleeves (14, 15) are slipped and wedged onto the same pair of mounting zones.

7. Leaf spring of plastic material according to claim 1, wherein two clamping sleeves (33, 34) are slipped and wedged onto different pairs of mounting zones.

8. Leaf spring of plastic material according to claim 1, wherein the spring eye body exhibits a bent piece of strip (7, 20, 27) of steel or of a fiber-reinforced plastic material, which in partial zones, appropriately its end zones, comprises the mounting zones to be wedged onto spring body's end zone (1).

9. Leaf spring of plastic material according to claim 8, wherein the piece of strip (7,20,27) is joined to a spring eye bushing (8), which latter is braced against the spring body's end zone (1).

10. Leaf spring of plastic material according to claim 9, wherein the spring eye bushing (8) is arranged between two clamping sleeves (33, 34).

11. Leaf spring of plastic material according to claim 9, wherein the bent piece of strip (7, 20, 27) closely fits against a part of the surface of the spring eye bushing (8).

12. Leaf spring of plastic material according to claim 8, wherein the spring eye body (26) exhibits two pieces of strip (27, 30) which with their parts forming the mounting zone adjoin the top and bottom side, respectively, of the spring body's end zone (1).

13. Method for the manufacture of a leaf spring of plastic material, which is connected to a spring eye body (6, 19, 26) at least at one end, wherein a leaf spring body is manufactured of fiber-reinforced plastic material, which at least at one spring end exhibits an end zone (1) with essentially plane parallel top and bottom sides (2, 3), wherein to these top and bottom sides (2, 3) or at least to one of them, a coating of plastic material is applied, which is composed of a plastic mass of duromer plastic containing reinforcing fibers and the thickness of which increases towards the spring end, and wherein subsequently the spring eye body (6, 19, 26), which has mounting zones of appropriately laminar design, is placed on the spring body's end zone (1) provided with these coatings of plastic material, so that the mounting zones adjoin these coatings, and wherein at least one clamping sleeve is slipped over the spring body's end zone (1) and over the mounting zones adjoining it, and thereby wedging the latter onto the spring body's end zone (1), whereupon the plastic material coatings are cured.

14. A method according to claim 13, wherein a spring eye body (6, 19, 26) with mounting zones is used, which latter exhibit at their pressure surfaces (11, 12) adjoining the plastic material coatings of the spring body's end zone (1) a relieflike surface structure, appropriately formed by grooves (13), so that when the mounting zones are wedged onto the spring body's end zone (1), plastic material from the coatings penetrates into the recesses of this surface structure.

* * * * *

UNITED STATES PATENT AND TRADEMARK OFFICE
CERTIFICATE OF CORRECTION

PATENT NO. : 4,762,307
DATED : August 9, 1988
INVENTOR(S) : HERBERT WOLTRON

It is certified that error appears in the above-identified patent and that said Letters Patent is hereby corrected as shown below:

Title page, item (73) Assignee:

"Isoport Verbundbauteil G.m.b.H." should be

--Isosport Verbundbauteile Ges.m.b.H.--
    Austria

Signed and Sealed this

Fifteenth Day of June, 1993

Attest:

MICHAEL K. KIRK

Attesting Officer

Acting Commissioner of Patents and Trademarks